United States Patent Office 3,629,197
Patented Dec. 21, 1971

3,629,197
MONOMERS AND POLYMERS OF ACRYLOYLOXY-PHENOL AND DERIVATIVES THEREOF
Roy Thomas Stiehl, Jr., Waynesboro, Va., assignor to E. I. du Pont de Nemours and Company, Wilmington, Del.
No Drawing. Continuation-in-part of application Ser. No. 642,735, June 1, 1967. This application Apr. 1, 1969, Ser. No. 812,392
Int. Cl. C08f *19/00;* C07c *69/52*
U.S. Cl. 260—47 U                7 Claims

ABSTRACT OF THE DISCLOSURE

Acryloyloxyphenol and derivatives thereof containing chloro or hydrocarbyl substituents, and homopolymers and copolymers thereof with other unsaturated monomers, are provided which are useful as antioxidants in shaped or extruded articles, especially textiles.

CROSS-REFERENCE TO RELATED APPLICATIONS

This application is a continuation-in-part of my copending application Ser. No. 642,735, filed June 1, 1967, now abandoned.

This invention relates to novel, highly effective antioxidants which are stable and retentive of their antioxidant power. More particularly, it relates to antioxidants which can be homopolymerized or polymerized readily with ethylenically unsaturated monomers to prepare polymerized materials which are highly resistant to oxidation.

BACKGROUND OF THE INVENTION

In the preparation of textile fabrics and other manufactured products, it is frequently desirable to apply finishes or coating materials to reduce static propensity, improve light stability, or achieve other desired effects. Many durable finishes or coating materials are vinyl polymers or interpolymers. However, it frequently happens that otherwise valuable finishes and coating materials are subject to deterioration through oxidation. The fabric or other substrate may itself be vulnerable to oxidative degradation.

Although numerous antioxidant materials are described in the prior art, most of these are not durable to laundering and other conditions of normal use when incorporated in finishes and coatings applied to fabrics and the like. Others have only a low antioxidant potential, or rapidly lose their initial activity under some commonly encountered condition such as mild basicity or exposure to sunlight. Discoloration is another troublesome problem which is encountered.

SUMMARY OF THE INVENTION

A class of excellent antioxidants has now been discovered, comprising esters of the general formulae:

(I) 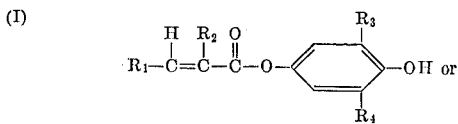

(II) 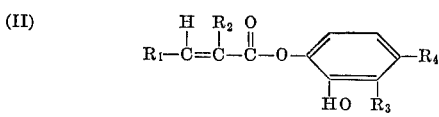

wherein $R_1$ and $R_2$ are individually selected from the class consisting of hydrogen, chlorine, and hydrocarbyl radicals of up to 6 carbon atoms, at least one of the radicals $R_1$ and $R_2$ being hydrogen; and $R_3$ and $R_4$ are individually selected from the class consisting of hydrogen and hydrocarbyl radicals of up to 6 carbon atoms. The term "hydrocarbyl" used herein, as well as generally in the art, includes acyclic or cyclic saturated or unsaturated monovalent hydrocarbon radicals. Examples of such esters include 4-acryloyloxyphenyl,
4-acryloyloxy-2-methylphenol,
4-methacryloyloxyphenol,
4-methylacryloyloxy-2-methylphenol,
4-methacryloyloxy-2-tert.-butylphenol,
2-acryloyloxyphenol,
2-methacryloyloxyphenol,
2-acryloyloxy-5-methylphenol,
2-acryloyloxy-6-methylphenol,
2-acryloyloxy-5,6-dimethylphenol,
4-acryloyloxy-2,6-ditert.-butylphenol,
4-methacryloyloxy-2,6-ditert.-butylphenol,
4-crotonyloxy-2,6-ditert.-butylphenol,
4-α-chloroacryloyloxy-2,6-ditert.-butylphenol,
4-cinnamoyloxy-2,6-ditert.-butylphenol,
4-α-butylacryloyloxy-2,6-ditert.-butylphenol,
4-α-phenylacryloyloxy-2,6-ditert.-butylphenol,
4-α-cyclohexylacryloyloxy-2,6-ditert.-butylphenol,
and 4-(β-vinylacryloyloxy)-2,6-ditert.-butylphenol.

The novel esters may be employed directly in their monomeric form as antioxidants, especially for other unsaturated solid or liquid monomeric compounds. However, the novel esters are more generally employed in the form of their polymers and copolymers.

The novel esters are readily prepared by reacting hydroquinone, catechol, or the appropriately substituted derivatives thereof with an equimolar quantity of acrylic anhydride or the appropriately substituted derivative thereof, in the presence of a small amount of sulfuric acid; or by reacting substituted hydroquinones, catechols, or derivatives thereof with acryloyl chloride or derivative thereof in the presence of an equimolar quantity of a tertiary amine such as triethylamine at 0° to 10° C. A typical reaction is:

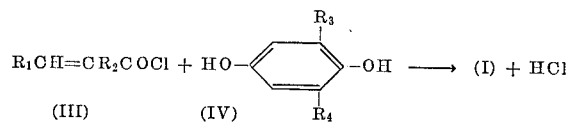

Under the conditions employed in the reaction, substantially all of the ester product comprises the ester of the phenolic hydroxyl in the 4-position of the ring with the acid chloride.

The preferred esters of the present invention include 4-acryloyloxyphenol, 2-acryloyloxyphenol, 4-methacryloyloxyphenol, 2-methacryloyloxyphenol, and other esters in which $R_3=R_4=$hydrogen. Other esters of the present invention include 4-acryloyloxy-2,6-ditert.-butylphenol; 4-α-chloroacryloyloxy-2,6-ditert.-butylphenol; and esters of the class, 4-α-alkylacryloyloxy-2,6-ditert.-butylphenol, wherein the alkyl group contains up to 6 carbon atoms, especially 4-methacryloyloxy-2,6-ditert.-butylphenol.

The invention comprehends a novel class of homopolymers of preferred ester monomers of Formulae I or II. These compounds, in which $R_1$ is hydrogen, readily form valuable homopolymers when, for example, heated at 60° C. in the presence of α,α'-azodiisobutyronitrile or related azo catalysts. These homopolymers constitute a class of high power, high molecular weight antioxidants having excellent utility for incorporation in polymers to be extruded or shaped into fibers, films, or other objects.

The homopolymers may also be employed as finishes or coatings for surfaces upon which they are substantive and which require antioxidant protection.

The invention also comprehends a novel class of copolymers of the ester monomers of Formulae I and/or II with at least one ethylenically unsaturated monomer copolymerizable therewith. These copolymers are prepared, for example, by heating the comonomers to 60° C. in the presence of α,α'-azodiisobutyronitrile.

Styrene, methyl vinyl ketone, acrylonitrile, methacrylonitrile, acrylic acid and esters thereof such as methyl acrylate, methacrylic acid and esters thereof such as methyl methacrylate, methacrylamide, acrylamide, N-methylacrylamide, N,N-dimethylacrylamide, N-methylmethacrylamide, and N,N-dimethylmethacrylamide are specific non-limitative examples of such suitable monomers. A broad variety of suitable copolymerizable monomers will be apparent to those skilled in the art. If desired, the ethylenically unusaturated monomer selected for copolymerization with the ester monomer of Formulae I and/or II may be chosen so as to impart enhanced substantivity to or compatibility with the specific substrate to be protected against oxidation. The ethylenically unsaturated monomer may also be chosen so as to impart or confer other desired effects, such as protection against static electricity or ultraviolet light. It is preferred that one of he monomers be an antistatic agent, e.g., 4-nonylphenoxypoly-(ethyleneoxy)ethylene acrylate. Obviously, several such ethylenically unsaturated monomers may be combined in a single polymer to achieve a desired multiple effect; monoethylenically unsaturated monomers are preferred. As employed in the present specification, the term "copolymer" is therefore intended to include terpolymers, tetrapolymers, and other polymers containing several components.

The ester monomers of Formulae I and II are extremely effective antioxidants in the form of their copolymers, and the amount of them incorporated in the preferred copolymer may therefore be very low, e.g., as low as about 0.1% by weight. Copolymers containing at least one of the ester monomers of Formulae I and II, wherein $R_1$ is hydrogen, are preferred, and in preparing these copolymers any desired amount of the monomer may be incorporated, with the homopolymer as the limit at the upper end of the range of copolymer composition. Thus, suitable and effective preferred copolymers may be prepared comprising from about 0.1 to 99.0% by weight of at least one of the ester monomers of Formulae I and II with at least one monoethylenically unsaturated monomer copolymerizable therewith when heated at 60° C. in the presence of α,α'-azodiisobutyronitrile. In preparing copolymers of the ester monomer of Formulae I and/or II wherein $R_1$ is other than hydrogen, the amount of other monoethylenically unsaturated monomer used in the reaction is high enough to carry out the copolymerization effectively; said amount preferably being at least about 50 mol percent. The resulting preferred product is accordingly a copolymer comprised of a minimum of about 0.1 weight percent, and a maximum of about 50 mol percent, of the ester monomer of Formulae I and II.

EXAMPLES

The nature of the present invention will be further illustrated by the following examples; however, these are not intended to be limitative. Parts and percentages are by weight unless otherwise indicated.

Example 1.—Preparation of various acryloyloxyphenol monomers (A) 4-methacryloyloxy-2,6-ditert.-butylphenol. — In a 500-ml. round-bottomed flask are mixed 88.8 g. (0.4 mol) of 2,6-ditert.-butylhydroquinone, 80.8 g. (0.8 mol) of triethylamine, and 200 ml. of tetrahydrofuran. The mixture is dissolved with stirring under nitrogen and cooled with ice. Over a period of 5 to 10 minutes, 41.8 g. (0.4 mol) of methacryloyl chloride is added under nitrogen, and stirring is continued for about 2 hours. The resulting mixture is poured into a large excess of water. The yield is 79.7 g. (69% of theory) of yellow solid. After 2 recrystallizations from ethanol a white, crystalline solid, 4-methacryloyloxy-2,6-ditert.-butylphenol, is obtained. It has a melting point of 135–137° C. The infra-red spectrum exhibits peaks at 2.7 microns attributable to hydroxyl, at 5.8 microns attributable to ester carbonyl, at 11.2 microns attributable to the 1,2,3,5-phenyl substitution pattern, and at 6.1 microns attributable to double bond contributing to an absorption. The solid is stored in a dark bottle to protect it from exposure to light.

Analysis data.—Calculated for $C_{18}H_{26}O_3$ (percent): C, 74.45; H, 9.02. Found (percent): C, 74.19; H, 9.02.

(B) 4-cinnamoyloxy-2,6-ditert.-butylphenol.—The procedure is repeated using 22.2 g. (0.1 mol) of 2,6-ditert.-butylhydroquinone, 15.8 g. (0.2 mol) of pyridine, 50 ml. of ethyl ether, and 16.65 g. (0.1 mol) of cinnamoyl chloride in place of the ingredients listed. The yield after purification is 15.5 g. (44% of theory). The product, 4-cinnamoyloxy-2,6-ditert.-butylphenol, has a melting point of 128–129° C. The infra-red spectrum exhibits peaks at 2.7, 5.8, and 6.1 microns as with the previously described product; a peak at 11.4 microns attributable to the 1,2,3,5-phenyl substitution pattern; and a peak at 13.1 microns attributable to monosubstituted benzene.

Analysis data.—Calculated for $C_{23}H_{28}O_3$ (percent): C, 78.37; H, 8.01. Found (percent): C, 78.33; H, 8.08.

(C) 4-acryloyloxy-2,6-ditert.-butylphenol. — Using the same general procedure 22.2 g. (0.1 mol) of 2,6-ditert.-butylhydroquinone, 20.2 g. (0.2 mol) of triethylamine, and 150 ml. of tetrahydrofuran are stirred under nitrogen until a clear solution is obtained and the mixture is cooled with ice. Over a period of about 10 minutes, 9.1 g. (0.1 mol) of acryloyl chloride is added and stirring is continued for 1 additional hour. The mixture is filtered to remove triethylamine hydrochloride and the filtrate is poured into an excess of water to give an oil which slowly solidifies to form an orange solid. After several recrystallizations from ethanol a white solid, 4-acryloyloxy-2,6-ditert.-butylphenol, is obtained. It has a melting point of 102–103° C. Its identity is confirmed by obtaining the nuclear magnetic resonance spectrum of a solution of the compound in deuterated chloroform, using tetramethylsilane as a reference. The data obtained are summarized in the following table:

| Structural feature | δ (in p.p.m.) | Integrated intensity | Theoretical hydrogens |
|---|---|---|---|
| Aromatic hydrogens | [1] 6.92 | 10 | 2 |
| Vinyl hydrogens | [2] 5.8–6.55 | 14 | 3 |
| Phenolic hydroxyl hydrogen | [3] 5.10 | 4.5 | 1 |
| tert.-Butyl hydrogens | [1] 1.43 | 94 | 18 |

[1] Singlet.
[2] Multiplet.
[3] Singlet (peak disappears upon exchange reaction with $D_2O$).

Analysis data.—Calculated for $C_{17}H_{24}O_3$ (percent): C, 73.88; H, 8.75. Found (percent): C, 73.42; H, 8.45.

(D) 4-methacryloyloxyphenol.—In a three-neck, round-bottomed flask are mixed 16.0 g. (0.145 mol) of recrystallized hydroquinone and 150 ml. of tetrahydrofuran. The mixture is dissolved with stirring under nitrogen atmosphere. To this, 21.0 g. of methacrylic anhydride (0.140 mol) and 1.0 ml. of sulfuric acid is added, and the resulting solution is stirred under nitrogen atmosphere at room temperature for 21 hours. The resulting mixture is poured into about 800 ml. of water, neutralized with sodium hydroxide, and stirred an additional hour under nitrogen atmosphere. The product, 4-methacryloyloxyphenol, separates as a white crystalline solid and is recrystallized twice from n-hexane. It has a melting point of 111–113° C. and is characterized by an infra-red spectrum which has peaks attributable to the functional groups present in 4-methacryloyloxyphenol.

*Analysis data.*—Calculated for $C_{10}H_{10}O_3$ (percent): C, 67.40; H, 5.62. Found (percent): C, 67.13; H, 5.55.

(E) 2-methacryloyloxyphenol.—In a three-neck, round-bottomed flask equipped with a mechanical stirrer and nitrogen inlet, 7.7 g. of catechol (0.07 mol) and 4.86 g. triethylamine (0.048 mol) is dissolved in 50 ml. of tetrahydrofuran with stirring and the solution is cooled to −20° to −30° C. while maintaining the nitrogen atmosphere. Next, 3.64 g. of methacryloyl chloride (0.035 mol) dissolved in 20 ml. of tetrahydrofuran is added slowly over a period of about 20 minutes. The mixture is stirred for approximately one hour. An additional 1.75 g. (0.017 mol) of triethylamine and 1.82 g. (0.017 mol) of methacryloyl chloride dissolved in 10 ml. of tetrahydrofuran is then added and stirring under nitrogen atmosphere at −10° to −20° C. is continued for 1.5 hours. The resulting mixture is poured with stirring into 500 ml. of water and stirring is conttinued for one hour under nitrogen atmosphere. The product, 2-methacryloyloxyphenol, is obtained as a reddish-orange oil which is decanted from the water layer. Recrystallization of the oil from hexane yields a white, crystalline solid having a melting point of 69–73° C. and an infra-red spectrum and nuclear magnetic resonance spectrum having peaks attributable to the functional groups present in 2-methacryloyloxyphenol.

*Analysis data.*—Calculated for $C_{10}H_{10}O_3$ (percent): C, 67.40; H, 5.62. Found (percent): C, 67.12, H, 5.56.

(F) 4-methacryloyloxy - 2 - tert.-butylphenol.—In a three-neck, round-bottomed flask equipped with a mechanical stirrer and a nitrogen inlet, 8.2 g. (0.0495 mol) of 2-tert.-butylhydroquinone is dissolved in 35 ml. of tetrahydrofuran and 5.4 g. (0.053 mol) of triethylamine is added to the solution. The solution is cooled to −40 to −50° C. and 5.2 g. (0.0498 mol) of methacryloyl chloride dissolved in 10 ml. of tetrahydrofuran is added, from a dropping funnel, over a period of 10 to 15 minutes. The mixture is stirred under nitrogen atmosphere at about −80° C. for approximately 2 hours. The resulting mixture is then poured into 700 ml. of water and stirred for 3 hours. The product, 4-methacryloyloxy-2-tert.butylphenol, is obtained as a gummy yellow solid. Recrystallization of the product 3 times from hexane yields a white, crystalline solid having a melting point of 88–90° C. and an infra-red spectrum and nuclear magnetic resonance spectrum having peaks attributable to the functional groups present in 4-methacryloyloxy-2-tert.-butylphenol.

*Analysis data.*—Calculated for $C_{14}H_{18}O_3$ (percent): C, 71.80; H, 7.70. Found (percent): C, 71.87; H, 7.74.

(G) 4-crotonoyloxy - 2,6 - ditert.-butylphenol.—In a three-neck, round-bottomed flask, equipped with a mechanical stirrer, a dropping funnel and an inlet for nitrogen, 11.0 g. (0.05 mol) of recrystallized 2,6-ditert.-butylhydroquinone is dissolved in 30 ml. of tetrahydrofuran and 5.1 g. (7.05 ml.) of triethylamine. The flask is immersed in a Dry-Ice/isopropanol bath and 5.2 g. (0.05 mol) of crotonoyl chloride dissolved in 20 ml. of tetrahydrofuran is added at a rate such that the temperature of the reaction mixture does not exceed −30° C. This requires approximately 5 minutes. The resulting solution is then stirred under nitrrogen atmosphere for 1 hour at −42° to −50° C.

The reaction mixture is then allowed to warm to about 0° C. over a period of one-half hour, after which the contents of the reaction flask are added to a vigorously stirred vessel containing 600 ml. of ice-cold water. The mixture is then stirred for an additional 2 hours under a stream of nitrogen. The product, 4-crotonoyloxy-2,6-ditert.-butylphenol, is obtained as a yellowish-cream colored viscous liquid which is separated from the water and recrystallized from hexane. After 2 additional recrystallizations from hexane, the product is a pure white solid with a melting point of 66–68° C.

Example 2.—Homopolymer of 4-methacryloyloxy-2,6-ditert.-butylphenol

The following materials are placed into a vessel equipped with a stirrer and reflux condenser and reacted under nitrogen at 60° C.:

Dimethylacetamide—7. g.
4 - methacryloyloxy - 2,6 - ditert.-butylphenol—3 g. (0.010 mol)
$\alpha,\alpha'$-azodiisobutyronitrile—0.03 g. (0.0002 mol)

After the reaction has proceeded for 7 hours, an additional 0.015 g. of $\alpha,\alpha'$-azodiisobutyronitrile is added and polymerization is continued for 16 additional hours.

The product is a viscous solution of the homopolymer of 4-methacryloyloxy-2,6-ditert.-butylphenol in dimethylacetamide. Polymerization is confirmed by an infra-red spectrum showing disappearance of peaks attributable to the monomer as compared with a spectrum of a sample in solution prior to polymerization.

The homopolymer so prepared is evaluated as an additive for spandex yarn. In this evaluation, the "control" yarn is a 60 denier spandex yarn (Du Pont "Lycra®" spandex yarn), conventionally spun, containing about 4% polymerized diisopropylaminoethyl methacrylate and about 5% $TiO_2$ as ultraviolet stabilizers. The "test" yarn is spun from the same solution, but an amount of about 2.5% by weight, based on the weight of the yarn, of the polymerized 4 - methacryloyloxy-2,6-ditert.-butylphenol, prepared as described above, is also included.

The stability of the "test" and "control" yarns upon exposure to light is then determined by stress-strain measurements before and after exposure to light generated by a xenon arc source. Initially, the "control" yarn has a tenacity of 0.75 g.p.d. and an elongation of 539%, while the "test" yarn has a tenacity of 0.74 g.p.d. and an elongation of 532%. The results after exposure to light are as follows:

TENACITY LOSS UPON EXPOSURE TO XENON ARC SOURCE

| | Loss after 40 hrs., percent | Loss after 60 hrs., percent |
|---|---|---|
| "Control" yarn | 47 | 65 |
| "Test" yarn | 23 | 50 |

Example 3.—Copolymer of 4-methacryloyloxy-2,6-ditert.-butylphenol, 4 - methacryloyloxy-2-hydroxybenzophenone, and glycidyl methacrylate The following materials are placed into a vessel equipped with a stirrer and reflux condenser and reacted under nitrogen at 60° C.:

Dimethylformamide—16 ml.
4-methacryloyloxy-2,6-ditert.-butylphenol—4.40 g. (0.015 mol)
4 - methacryloyloxy - 2 - hydroxybenzophenone — 1.75 g. (0.006 mol)
Glycidyl methacrylate—0.68 g. (0.005 mol)
$a,\alpha'$-Azodiisobutyronitrile—0.07 g. (0.0004 mol)

After the first 8 hours an additional 0.03 g. of the azo catalyst is added, and after 23 hours an additional 0.03 g. is added. The total reaction time is 31 hours.

The product, a copolymer of 4-methacryloyloxy-2,6-ditert.-butylphenol, 4 - methacryloyloxy-2-hydroxybenzophenone, and glycidyl methacrylate (64/26/10 wt. percent), is a white solid, obtained in 95% conversion.

To evaluate the antioxidant power of the copolymer so prepared, its effect on the light stability of a polymeric antistatic agent is tested. Films are cast from a "control sample" comprising a 40% solution of 25 cc. of a 4-nonylphenoxypoly(ethyleneoxy)ethylene acrylate/glycidyl methacrylate/acrylic acid polymer (88/10/2 wt. percent) in dimethylformamide, the poly(ethyleneoxy) segment containing about 40 units; 25 cc. of acetone; and 0.6 cc. of tris(dimethylaminomethyl)phenol; the films being cast on supporting films of polyethylene terephthalate and heated in an oven at 135° C. for 30 minutes to effect cure. The "test sample" is prepared in the same way, except that 7.3 cc. of the 30% solution in dimethylformamide of the copolymer prepared as described above is added, and 0.7 cc. of the phenol is used. In the initial samples, 39% of the weight of the "control" sample and 42% of the weight of the "test" sample are acetone-extractable. After 40 hours exposure to a xenon arc source, 48% of the "control" sample is extractable, illustrating degradation. Only 30% of the "test" sample is acetone-extractable after 40 hours exposure to a xenon arc source, illustrating protection of the film against degradation.

Example 4.—Copolymer of 4-methacryloyloxy-2,6-ditert.-butylphenol, glycidyl methacrylate, and 4-nonylphenoxypoly(ethyleneoxy)ethylene acrylate The following materials are placed into a vessel equipped with a stirrer and reflux condenser and reacted under nitrogen at 60° C. for 8 hours:

Dimethylformamide—37.5 ml.
4 - methacryloyloxy - 2,6 - ditert. - butylphenol — 0.35 g. (0.0012 mol)
Glycidyl methacrylate—3.0 g. (0.0211 mol)
4-nonylphenoxypoly(ethyleneoxy)ethylene acrylate—22.0 g. (0.0115 mol)
α,α'-Azodiisobutyronitrile—0.25 g. (0.0015 mol)

The product, a copolymer of 4-methacryloyloxy-2,6-ditert.-butylphenol, glycidyl methacrylate, and 4-nonylphenoxypoly(ethyleneoxy)ethylene acrylate (1.4/11.9/86.7 wt. percent) is obtained as a clear, slightly brown, viscous solution. It is designated as the "test copolymer."

A "control copolymer" is also prepared using the same procedure, except that the 4-methacryloyloxy-2,6-ditert.-butylphenol is omitted.

Twenty-five cc. portions of 40% dimethylformamide solution of the "test copolymer" and "control copolymer," to each of which 0.6 cc. portions of tris(dimethylaminomethyl)phenol have been added, are heated for 15 minutes at 80° C. and dispersed in 975 cc. of water. The dispersions are used to treat 115 g. samples of finish-free, commercially available acrylic staple (Du Pont Orlon® Type 42 acrylic staple fiber) at 100% pickup of the aqueous dispersion on the weight of the fiber. The treated staple fibers are heated at 130° C. for 15 minutes and processed into 20/1 cotton count, 11 Z twist yarns and these are then double knit into fabrics having a weight of 7 oz. per sq. yd.

The property of these fabrics to exhibit static electrical charge after exposure to light and laundering is determined by measuring the static charge decay rate using the Vykand Static Propensity Tester, manufactured by the Vykand Corporation. In this equipment the fabric is used to form one plate of a capacitor and the static detector is used as the other plate. A negative charge of 5,000 volts is placed upon the fabric, then the sample is grounded and the time required for leakage to 2,500 volts is measured. This is referred to as the half-life of the static charge. Extreme precautions are necessary to avoid contamination and to maintain constant humidity. Measurements are made at 30% relative humidity (RH).

In the results reported below, each cycle comprises a 4-hour exposure to a xenon light source followed by laundering with a commercially available detergent using water delivered at 60° C. and tumble drying in a machine dryer with the exhaust air at 74° C. at the conclusion of the drying step.

HALF-LIFE OF STATIC CHARGE (SECONDS) AFTER SUCCESSIVE CYCLES OF XENON ARC LIGHT EXPOSURE, LAUNDERING, AND TUMBLE DRYING

| Fabric coated with— | Cumulative light exposure at— | | |
|---|---|---|---|
| | 4 hrs. | 8 hrs. | 12 hrs. |
| "Control copolymer" | 5 | 5 | 35 |
| "Test copolymer" | 2 | 2 | 3 |

The above results show that the "test copolymer" retains low static propensity (short half-life of static charge) after repeated exposure to light and laundering.

Example 5.—Copolymer of 4-methacryloyloxy-2,6-ditert.-butylphenol, 4 - methacryloyloxy-2-hydroxybenzophenone, glycidyl methacrylate, and methacrylic acid The following materials are placed into a vessel equipped with a stirrer and a reflux condenser and reacted under nitrogen at 60° C. for 21 hours:

Dimethylformamide—50 ml.
4 - methacryloyloxy - 2,6-ditert.-butylphenol—9 g. (0.031 mol)
4-methacryloyloxy-2-hydroxybenzophenone—9 g. (0.032 mol)
Glycidyl methacrylate—1.60 g. (0.011 mol)
Methacrylic acid—0.40 g. (0.005 mol)
α,α'-Azodiisobutyronitrile—0.20 g. (0.001 mol)

Gelation of the polymer occurs during the course of this reaction; however, the polymer is soluble in an excess of the solvent.

The product, a copolymer of 4-methacryloyloxy-2,6-ditert.-butylphenol, 4-methacryloyloxy-2-hydroxybenzophenone, glycidyl methacrylate, and methacrylic acid (45/45/8/2 wt. percent) is a white solid.

Films are cast as in Example 3 from a mixture of a 40% solution of 25 cc. of a 4-nonylphenoxypoly(ethyleneoxy)ethylene acrylate/glycidyl methacrylate/acrylic acid terpolymer (88/10/2 wt. percent) in dimethylformamide, 0.6 cc. of tris(dimethylaminomethyl)phenol, and an 8% solution of the copolymer prepared as described above in dimethylformamide. The films are cast, cured, and evaluated by acetone extraction as in Example 3. In initial samples of the film, 22% of the weight is acetone extractable. In samples of the film exposed to a xenon arc source for 40 hours, 23% of the weight is acetone extractable, illustrating protection of the film against degradation, which would be expected to increase acetone-extractable materials substantially.

Example 6.—Copolymer of 4-methacryloyloxy-2,6-ditert.-butylphenol, 4 - methacryloyloxy - 2 - hydroxybenzophenone, glycidyl methacrylate, and 4-nonylphenoxypoly(ethyleneoxy)ethylene acrylate The following materials are placed into a vessel equipped with a stirrer and a reflux condenser and reacted under nitrogen at 60° C.:

Dimethylformamide—37.5 ml.
4-methacryloyloxy-2,6-ditert.-butylphenol—1.06 g. (0.004 mol)
4-methacryloyloxy-2-hydroxybenzophenone—0.42 g. (0.001 mol)
Glycidyl methacrylate—3.0 g. (0.021 mol)
4-nonylphenoxypoly(ethyleneoxy)ethylene acrylate—22.0 g. (0.012 mol)
α,α'-Azodiisobutyronitrile—0.25 g. (0.0015 mol)

After the first 7 hours an additional 0.125 g. of the azo catalyst is added, and the reaction is continued for an additional 15.5 hours. The product is a copolymer of 4 - methacryloyloxy - 2,6 - ditert. - butylphenol, 4 - methacryloyloxy - 2 - hydroxybenzophenone, glycidyl methacrylate, and 4-nonylphenoxypoly(ethyleneoxy)ethylene acrylate (4.0/1.6/11.3/83.1 wt. percent).

The copolymer is evaluated on fabric in the same way as the "test copolymer" of Example 4, using the same "control copolymer" as Example 4, except that a commercially available sodium hypochlorite solution is added at a concentration of 100 parts per million in the laundering step. After two cycles (8 hours cumulative light exposure) the fabric treated with the copolymer prepared above exhibits a static charge half-life of 10 seconds as contrasted with a static charge half-life of 28 seconds for the fabric treated with the "control copolymer."

Example 7.—Copolymer of 4-methacryloyloxy-2,6-ditert.-butylphenol, 4 - methacryloyloxy - 2 - hydroxybenzophenone, acrylic acid, glycidyl methacrylate, and 4-nonylphenoxypoly(ethyleneoxy)ethylene acrylate The following materials are placed into a vessel equipped with a stirrer and a reflux condenser and reacted under nitrogen at 60° C. for 7 hours:

Dimethylformamide—37.5 ml.
4-methacryloyloxy-2,6-ditert.-butylphenol—0.35 g. (0.0012 mol)
4-methacryloyloxy-2-hydroxy-benzophenone—0.14 g. (0.0005 mol)
Acrylic acid—0.5 g. (0.0069 mol)
Glycidyl methacrylate—2.5 g. (0.0176 mol)
4-nonylphenoxypoly(ethyleneoxy)ethylene acrylate—22.0 g. (0.0116 mol)
$\alpha,\alpha'$-Azodiisobutyronitrile—0.25 g. (0.0015 mol)

The product is a copolymer of 4-methacryloyloxy-2,6-ditert.-butylphenol, 4 - methacryloyloxy - 2 - hydroxybenzophenone, acrylic acid, glycidyl methacrylate, and 4-nonylphenoxypoly(ethyleneoxy)ethylene acrylate (1.4/0.5/2.0/9.8/86.3 wt. percent).

Ten cc. of a 40% solution of the copolymer prepared as described above is mixed with 10 cc. of acetone and 0.24 cc. of tris(dimethylaminomethyl)phenol, and films are cast, cured, and evaluated by acetone extraction as in Example 3. To provide direct comparison with these "test" films, "control" films are prepared from 10 cc. of a 40% solution of a 4-nonylphenoxypoly(ethyleneoxy)ethylene acrylate/glycidyl methacrylate/acrylic acid terpolymer (88/10/2 wt. percent) in dimethylformamide, 10 cc. of acetone, and 0.24 cc. of tris(dimethylaminomethyl)phenol and these films are cast, cured, and evaluated by acetone extraction in the same way. The initial sample of the "test" film contains 25% acetone-extractable material and after 40 hours of exposure to a zenon arc source only 26% is extractable, illustrating protection of the film against degradation. The initial sample of the "control" film contains 26% acetone-extractable material and after 40 hours of exposure to a xenon arc source 39% is extractable, illustrating degradation.

Although the novel antioxidant ester of Formula I can be copolymerized directly with several unsaturated monomers to form a complex copolymer, there are many practical situations in which it is desired to make two or more relatively simple copolymers and blend them. This is especially so if the copolymers are to be cured to form a highly cross-linked, insoluble coating in the final stage and changes in composition after the final stage are therefore considered unlikely. Attaining and maintaining a uniform blend of the copolymer prior to the cure is an important problem in such cases, however, particularly when application from an aqueous dispersion is desired and one copolymer is water soluble while the other is not.

In a particularly preferred process embodiment of the present invention, a solution of a copolymer of glycidyl methacrylate and an ester of Formula I in an organic solvent and a solution of a copolymer of glycidyl methacrylate and 4-nonylphenoxypoly(ethyleneoxy)ethylene acrylate in an organic solvent, used in proportions such that the weight of 4-nonylphenoxypoly(ethyleneoxy)ethylene acrylate is from about 70% to 90% of the total weight of the two copolymers, are mixed together with about 5% to 10% by weight, based on the weight of the copolymers, of tris(dimethylaminomethyl)phenol, and the mixture is heated at about 80° C. for about 15 minutes to form an interpolymer of said copolymers by interreaction of some of said glycidyl groups; dispersing said interpolymer in water and applying it upon a fiber to form a coating thereon; and curing the interpolymer by heating it at about 130° to 160° C. for about 15 minutes. The copolymer containing the poly(ethyleneoxy) linkages, which is water soluble, is an excellent antistatic agent, but requires an antioxidant for long-range effectiveness. The copolymer containing the ester of Formula I provides an excellent antioxidant, but the copolymer is insoluble in water and the mixture of the two copolymers separates and loses its homogeneity when an aqueous dispersion is made. However, the interpolymer formed by interreaction of some of the glycidyl groups is readily dispersed in water and retains its homogeneity; while after final curing the interpolymer has high durability on the fiber in textile processing and fabric use to confer long-lasting protection against static. Dispersibility of the interpolymer can also be improved by incremental addition of the glycidyl methacrylate ingredient in the preparation of the copolymers.

Example 8.—Aqueous dispersion of partially cured interpolymer

Sixty-four g. of a dimethylformamide solution containing 30 wt. percent of the copolymer of Example 3, composed of 4-methacryloyloxy-2,6-ditert.-butylphenol, 4-methacryloyloxy-2-hydroxybenzophenone, and glycidyl methacrylate (64/26/10 wt. percent), is mixed with 2108 g. of a dimethylformamide solution containing 40 wt. percent of a 4-nonylphenoxypoly(ethyleneoxy)ethylene acrylate/glycidyl methacrylate (90/10) copolymer. The resulting solution is mixed with 50 g. of tris(dimethylaminomethyl)phenol and the mixture is heated on a steam bath at 80° C. for 15 minutes. The mixture is then fed at a uniform rate into a stream of water and forms a uniform dispersion which is applied to commercially available acrylic tow (Du Pont Orlon® Type 42 acrylic tow) at the rate of 0.9% solids, based on the weight of the tow. The treated tow is cut to staple fibers, dried, and cured by heating it for 14 minutes at a maximum applied temperature of 153° C. The treated staple fibers are processed into 1.5 woolen run, 3.5 Z twist yarns and used as the filling with a warp of untreated acrylic staple yarns to weave a blanket weight fabric, designated as the "test fabric."

A "control fabric" is also made following the identical procedure, except that no solution of the copolymer of Example 3 is added and the preheating step on the steam bath is omitted.

The fabrics are tested for static propensity as in Example 4, with repeated cycles of 4-hour exposures of the fabrics to a xenon light source followed by laundering, tumble drying and determination of the static charge decay rate of the dried fabric. However, the first determination of the static charge decay rate is not made until the end of the third cycle (12 hours cumulative light exposure).

HALF LIFE OF STATIC CHARGE (SECONDS) BEGINNING WITH THIRD CYCLE OF XENON ARC LIGHT EXPOSURE, LAUNDERING, AND TUMBLE DRYING

|  | Cumulative light exposure at— | | | | |
| --- | --- | --- | --- | --- | --- |
|  | 12 hrs. | 16 hrs. | 20 hrs. | 24 hrs. | 28 hrs. |
| "Control fabric" | 13 | 42 | 23 | 31 | >100 |
| "Test fabric" | 3 | 6 | 5 | 14 | 12 |

Example 9.—Copolymers of various acryloyloxyphenols with glycidyl methacrylate and 4-nonylphenoxypoly (ethyleneoxy)ethylene acrylate In a series of copolymer preparation reactions, a quantity of an acryloyloxyphenol monomer equivalent to 0.006 mol is placed in each instance into a vessel equipped with a stirrer and reflux condenser and reacted under nitrogen at 60° C. for 7 hours with the following materials:

Dimethylformamide—19.0 ml.
Glycidyl methacrylate—1.24 g. (0.0086 mol)
4-nonylphenoxypoly(ethyleneoxy)ethylene acrylate— 11.0 g. (0.0057 mol)
α,α'-Azodiisobutyronitrile—0.10 g. (0.006 mol)

An additional 0.05 g. of α,α'-azodiisobutyronitrile is then introduced, and polymerization is continued for 16 hours. The products are obtained as viscous solutions in dimethylformamide of copolymers of the monomers listed in the table.

The copolymers prepared include a control copolymer with no acryloyloxyphenol component and a comparative copolymer made with 4-acryloyloxymethyl-2,6-ditert.-butylphenol, a monomer and copolymeric product derived therefrom which do not fall within the scope of the present invention.

Four-gram portions of 40% dimethylformamide solutions of each of the copolymers, to which 0.1 ml. portions of tris-(dimethylaminomethyl) phenol have been added in each case, are dissolved in 400 g. portions of acetone. The solutions are used to treat samples of fabric of commercially available acrylic staple (Du Pont Orlon® Type 42 acrylic staple fiber). The fabric samples, which have a weight of approximately 10 oz. per sq. yd., are immersed in the solution for about 5 minutes and squeezed through a wringer to give a liquid pickup of 265±15%. This gives a pickup of 1.05% solids on the fabric surface. The fabric samples are air dried at room temperature and cured at 130° C. for 30 minutes.

The fabrics are laundered with a commercially available detergent using water delivered at 60° C. and tumble dried in a machine dryer with the exhaust air at 74° C. at the conclusion of the drying step. The laundered fabrics are conditioned at 30% relative humidity and the static charge decay rate measured as described in Example 4. The fabrics are then subjected to cycles of 4-hour exposures to a xenon light source followed by laundering and static charge decay measurements as described in Example 4. The results are reported in Table I.

The present invention provides highly effective antioxidants which are stable and retentive of their antioxidant power. The monomers, homopolymers, and copolymers of this invention all can be effectively used as antioxidants. The use, in copolymeric form, is especially desirable in that the comonomer may be chosen so as to impart or confer other desired effects. The wide range of uses for these antioxidants, especially in the textile field, will be apparent by those skilled in the art.

What is claimed is:

1. A homopolymer of an ester of the formula selected from the group consisting of:

(I)
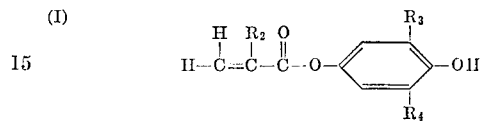

and (II)
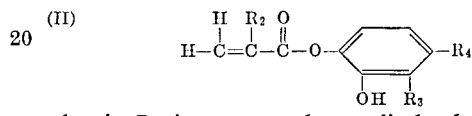

wherein $R_2$ is a monovalent radical selected from the class consisting of hydrogen, chlorine, and hydrocarbyl radicals of up to 6 carbon atoms, and $R_3$ and $R_4$ are monovalent radicals individually selected from the class consisting of hydrogen and hydrocarbyl radicals of up to 6 carbon atoms.

2. A copolymer consisting essentially of at least one ester of the formula selected from the group consisting of:

(I)
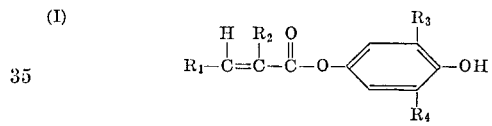

and (II)
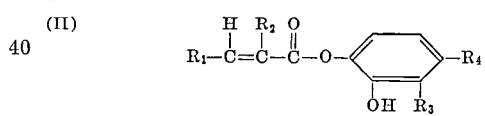

wherein $R_1$ and $R_2$ are monovalent radicals individually selected from the class consisting of hydrogen, chlorine, and hydrocarbyl radicals of up to 6 carbon atoms, at least one of the radicals $R_1$ and $R_2$ being hydrogen and $R_3$ and $R_4$ are monovalent radicals individually selected from the class consisting of hydrogen and hydrocarbyl radical of up to 6 carbon atoms with at least one other ethylenically unsaturated monomer.

3. The copolymer of claim 2 wherein said ester constitutes from at least about 0.1 percent by weight of said copolymer and wherein the remainder of said copolymer is essentially at least one other ethylenically unsaturated monomer.

4. The copolymer of claim 3 wherein said percent by weight is less than about 99.0.

5. The copolymer of claim 3 wherein recurring units of said ester constitute at least about 50 mol percent of said copolymer.

TABLE I.—HALF-LIFE OF STATIC CHARGE (SECONDS) AFTER SUCCESSIVE CYCLES OF XENON ARC LIGHT EXPOSURE, LAUNDERING AND TUMBLE DRYING OF ACRYLIC FABRIC COATED WITH COPOLYMER OF ACRYLOYLOXYPHENOL MONOMER (0.006 MOL), GLYCIDYL METHACRYLATE (0.0086 MOL), AND 4-NONYLPHENOXYPOLY (ETHYLENEOXY)-ETHYLENE ACRYLATE (0.0057 MOL)

| Acryloyloxyphenol monomer | Cumulative light exposure at— | | | | | | |
|---|---|---|---|---|---|---|---|
| | 0 hrs. | 4 hrs. | 8 hrs. | 12 hrs. | 20 hrs. | 32 hrs. | 40 hrs. |
| 4-acryloyloxy-2,6-ditert.-butylphenol | 2 | 3 | 2 | 3 | 4 | 22 | 60 |
| 4-methacryloyloxy-2-tert.-butylphenol | 2 | 2 | 3 | 4 | 6 | 15 | 36 |
| 4-methacryloyloxy-2,6-ditert.-butylphenol | 2 | 2 | 3 | 4 | 6 | 25 | 64 |
| 4-methacryloyloxyphenol | 2 | 2 | 2 | 2 | 3 | 8 | 24 |
| 2-methacryloyloxyphenol | 2 | 2 | 2 | 2 | 3 | 10 | 29 |
| 4-cinnamoyloxy-2,6-ditert.-butylphenol | 2 | 2 | 3 | 3 | 6 | 27 | 109 |
| 4-crotonoyloxy-2,6-ditert.-butylphenol | 2 | 2 | 2 | 2 | 2 | 27 | 152 |
| None (control copolymer) | 2 | 2 | 2 | 3 | 6 | 52 | 202 |
| 4-acryloyloxymethyl-2,6-ditert.-butylphenol (comparative example) | 6 | 53 | 151 | | | | |

UTILITY

The present invention provides highly useful anti-oxidants. The above results illustrate the effectiveness of these antioxidants. In particular, these antioxidants are effective in increasing the useful life of the copolymeric antistatic agent. The samples of the present invention are efficiently protected against losses in tenacity (as is seen in the stress-strain measurements in Example 2) and degradation (as is seen in the acetone-extractability measurements in Examples 3, 5 and 7 due to exposure to a xenon arc light. Most significantly, these antioxidants are durable. As is clearly illustrated in Examples 4, 6 8, and 9, the antioxidants are effective after laundering and exposure to a xenon arc light. The lower static propensity (shorter half-life of static charge) of these samples after repeated laundering, indicates an increase in the useful life of the antistatic agent due to the durable presence of the antioxidants of this invention.

6. The copolymer of claim 2 wherein said monomer is monoethylenically unsaturated.

7. The copolymer of claim 2 wherein said monomer is an antistatic agent.

References Cited

UNITED STATES PATENTS

| | | | |
|---|---|---|---|
| 3,116,305 | 12/1963 | Morris | 260—410.5 |
| 3,133,042 | 5/1964 | Tocker | 260—45.5 |
| 3,341,627 | 9/1967 | Wilkinson | 260—898 |
| 3,383,359 | 6/1968 | Weitzel | 260—47 |
| 3,413,261 | 11/1968 | Schalin | 260—45.9 |
| 3,425,988 | 2/1969 | Gorman | 260—47 |
| 3,441,545 | 4/1969 | Blatz | 260—78.5 |

FOREIGN PATENTS 670,675  1/1966  Belgium _____ 260—47

OTHER REFERENCES

Shalitin et al.: J. Am. Chem. Soc., 86(11) (1964), p. 2292.

JOSEPH L. SCHOFER, Primary Examiner

C. A. HENDERSON, Jr., Assistant Examiner

U.S. Cl. X.R.

8—115.6; 117—139.5; 260—80.72, 80.81, 486 R, 830 R, 836 Dig 21